United States Patent
Aruga

(10) Patent No.: US 12,153,145 B2
(45) Date of Patent: Nov. 26, 2024

(54) MOBILE BODY, MOBILE BODY POSITION DISPLAY SYSTEM, AND METHOD THEREFOR

(71) Applicant: SEIKO EPSON CORPORATION, Tokyo (JP)

(72) Inventor: Naoto Aruga, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 612 days.

(21) Appl. No.: 17/216,715

(22) Filed: Mar. 30, 2021

(65) Prior Publication Data
US 2021/0302595 A1 Sep. 30, 2021

(30) Foreign Application Priority Data
Mar. 30, 2020 (JP) .................. 2020-059823

(51) Int. Cl.
| G01S 19/34 | (2010.01) |
| G01S 19/19 | (2010.01) |
| G06F 3/14  | (2006.01) |
| H04W 4/80  | (2018.01) |

(52) U.S. Cl.
CPC .............. *G01S 19/34* (2013.01); *G01S 19/19* (2013.01); *G06F 3/14* (2013.01); *H04W 4/80* (2018.02)

(58) Field of Classification Search
CPC ...... G01S 19/19; G01S 2205/08; G01S 19/34; G01S 5/0251; G01S 5/0027; G01S 5/14; A63B 24/0021; A63B 2102/32; A63B 2225/50; A63B 2220/13; A63B 2220/12; A63B 69/3658; A63B 2024/0053; A63B 2024/0034
See application file for complete search history.

(56) References Cited

U.S. PATENT DOCUMENTS

| 6,524,199 B2* | 2/2003 | Goldman ............... A63B 45/00 |
| | | 342/450 |
| 7,095,312 B2* | 8/2006 | Erario .................... A63B 71/06 |
| | | 342/357.57 |
| 7,791,982 B2* | 9/2010 | Karr ....................... A63B 43/00 |
| | | 367/140 |
| 8,040,219 B2* | 10/2011 | Haartsen .............. G01S 5/0236 |
| | | 342/464 |
| 10,213,646 B2* | 2/2019 | Sandel .................... G01S 19/34 |
| 2010/0151955 A1* | 6/2010 | Holden .............. A63B 24/0021 |
| | | 473/409 |
| 2014/0286213 A1* | 9/2014 | Morrison .......... H04W 52/0261 |
| | | 370/311 |
| 2016/0360378 A1* | 12/2016 | Borowski ......... H04M 1/72412 |

FOREIGN PATENT DOCUMENTS

| CN | 108144285 A | * | 6/2018 |
| JP | 2018048955  |   | 3/2018 |

* cited by examiner

*Primary Examiner* — Cassi J Galt
(74) *Attorney, Agent, or Firm* — JCIPRNET

(57) ABSTRACT

A mobile body specifies a current position of the mobile body with a position specification unit. Further, a detection units detects that the mobile body is in a still state after starting moving from a still state, and a signal containing the specified current position is output to the outside. The mobile body includes a power unit that supplies power to power-consuming units inside the mobile body. The power unit supplies power to the position specification unit during a period from first timing after the mobile body starts the movement to second timing after the mobile body enters the still state.

15 Claims, 14 Drawing Sheets

| | TARGET | BEFORE USE | START OF MOVEMENT (t0) | DURING MOVEMENT | FALLING AND STOPPING (t1) | PREDETERMINED PERIOD Δt | FINAL STATE (t5) |
|---|---|---|---|---|---|---|---|
| GOLF BALL | POWER UNIT | ON | ← | ← | ← | ← | ← (OR OFF) |
| | CPU | OFF | ← | ← | ON | ← | INTERMITTENT → OFF |
| | GPS | OFF | ← | ← | ON | ON → OFF | OFF |
| | OTHER | TURNING ON OF DETECTION UNIT | DETECTION OF HITTING IMPACT | | START OF POSITION MEASUREMENT | TURNING OFF OF GPS AFTER MEASUREMENT | |
| GOLF CART | CONTROL UNIT | REGISTRATION AND ACQUISITION OF CURRENT POSITION | | | | ACQUISITION OF BLE BEACON | DISPLAY OF BALL POSITION ON MAP |
| | DISPLAY | MAP OF CURRENT POSITION | | | | FREELY-SELECTED INTERMITTENT OPERATION | |

| | TARGET | BEFORE USE | START OF MOVEMENT (t0) | DURING MOVEMENT | FALLING AND STOPPING (t1) | PREDETERMINED PERIOD Δt | FINAL STATE (t5) |
|---|---|---|---|---|---|---|---|
| GOLF BALL | POWER UNIT | ON | → | → | → | → | → (OR OFF) |
| | CPU | OFF | ON | → | → | → | INTERMITTENT → OFF |
| | GPS | OFF | ON | → | → | ON → OFF | OFF |
| | OTHER | TURNING ON OF DETECTION UNIT | DETECTION OF HITTING IMPACT | | START OF POSITION MEASUREMENT | TURNING OFF OF GPS AFTER MEASUREMENT | |
| GOLF CART | CONTROL UNIT | REGISTRATION AND ACQUISITION OF CURRENT POSITION | | | | ACQUISITION OF BLE BEACON | DISPLAY OF BALL POSITION ON MAP |
| | DISPLAY | MAP OF CURRENT POSITION | | | | FREELY-SELECTED INTERMITTENT OPERATION | |

FIG. 9

| | TARGET | BEFORE USE | START OF MOVEMENT (t0) | DURING MOVEMENT | FALLING AND STOPPING (t1) | PREDETERMINED PERIOD Δt | FINAL STATE (t5) |
|---|---|---|---|---|---|---|---|
| GOLF BALL | POWER UNIT | ON | ↓ | ↓ | ↓ | ↓ | ← (OR OFF) |
| | CPU | ON | ↓ | ↓ | ↓ | ↓ | INTERMITTENT → OFF |
| | GPS | OFF | ↓ | ON | ↓ | ON → OFF | OFF |
| | OTHER | PAIRING | | DETECTION OF PAIRING CANCELLATION | | TURNING OFF OF GPS AFTER MEASUREMENT | FREELY-SELECTED INTERMITTENT OPERATION |
| GOLF CART | CONTROL UNIT | REGISTRATION AND ACQUISITION OF CURRENT POSITION | | | | ACQUISITION OF BLE BEACON | |
| | DISPLAY | MAP OF CURRENT POSITION | | | | DISPLAY OF BALL POSITION ON MAP | |

FIG. 10

MOBILE BODY, MOBILE BODY POSITION DISPLAY SYSTEM, AND METHOD THEREFOR

The present application is based on, and claims priority from JP Application Serial Number 2020-059823, filed Mar. 30, 2020, the disclosure of which is hereby incorporated by reference herein in its entirety.

BACKGROUND

1. Technical Field

The present disclosure relates to a mobile body and a technique of displaying a position thereof.

2. Related Art

Hitherto, a system for tracking a position of various types of targets has been proposed. For example, JP-A-2018-48955 discloses a system intended to accurately track a position of a target such as a mountain climber without preparing a large-scale infrastructure.

This system uses a device that detects a position using an artificial satellite such as a global navigation satellite system (hereinafter, referred to as GNSS) and a communication device that informs the outside about the position. However, when both the devices are simultaneously operated, power consumption is increased, and thus both the devices are caused to be operated exclusively from each other.

However, when this technique is to be applied to a mobile body that moves at a distance from a user, such as a golf ball and an arrow shot from a crossbow, it is difficult to prepare a sufficient power source, and it is difficult to operate the position detection device with the GNSS for a long time. Further, unlike a device carried by a user such as a mountain climber, it is difficult to provide a golf ball or the like with a switch for turning on/off power. Thus, it has been pointed out that there is a problem in that, when power is always turned on, power such as a battery is exhausted for a relatively short time.

SUMMARY

The present disclosure can be realized as the following exemplary embodiments or application examples. A mobile body according to the present disclosure includes a position specification unit configured to specify a current position of the mobile body, a detection unit configured to detect that the mobile body is in a still state after starting moving from a still state, an output unit configured to output, to an outside, a signal containing the specified current position, and a power unit configured to supply power to power-consuming units inside the mobile body, and supply power to the position specification unit during a period from first timing after the mobile body starts the movement to second timing after the mobile body enters the still state. Further, a method of displaying a position of a mobile body according to the present disclosure includes operating a position specification unit configured to specify a current position of the mobile body, thereby specifying a position of the mobile body, detecting that the mobile body is in a still state after starting moving from a still state, outputting, to an outside, a signal containing the specified current position, supplying power to power-consuming units inside the mobile body, and supplying power to the position specification unit during a period from first timing after the mobile body starts the movement to second timing after the mobile body enters the still state, and receiving the signal from the mobile body, and displaying the current position of the mobile body on a display unit.

BRIEF DESCRIPTION OF THE DRAWINGS

FIG. 8 is an explanatory view summarizing operations in a first exemplary embodiment.

FIG. 9 is an explanatory view summarizing operations in a second exemplary embodiment.

FIG. 10 is an explanatory view summarizing operations in a third exemplary embodiment.

DESCRIPTION OF EXEMPLARY EMBODIMENTS

A. First Exemplary Embodiment

Figure 1:
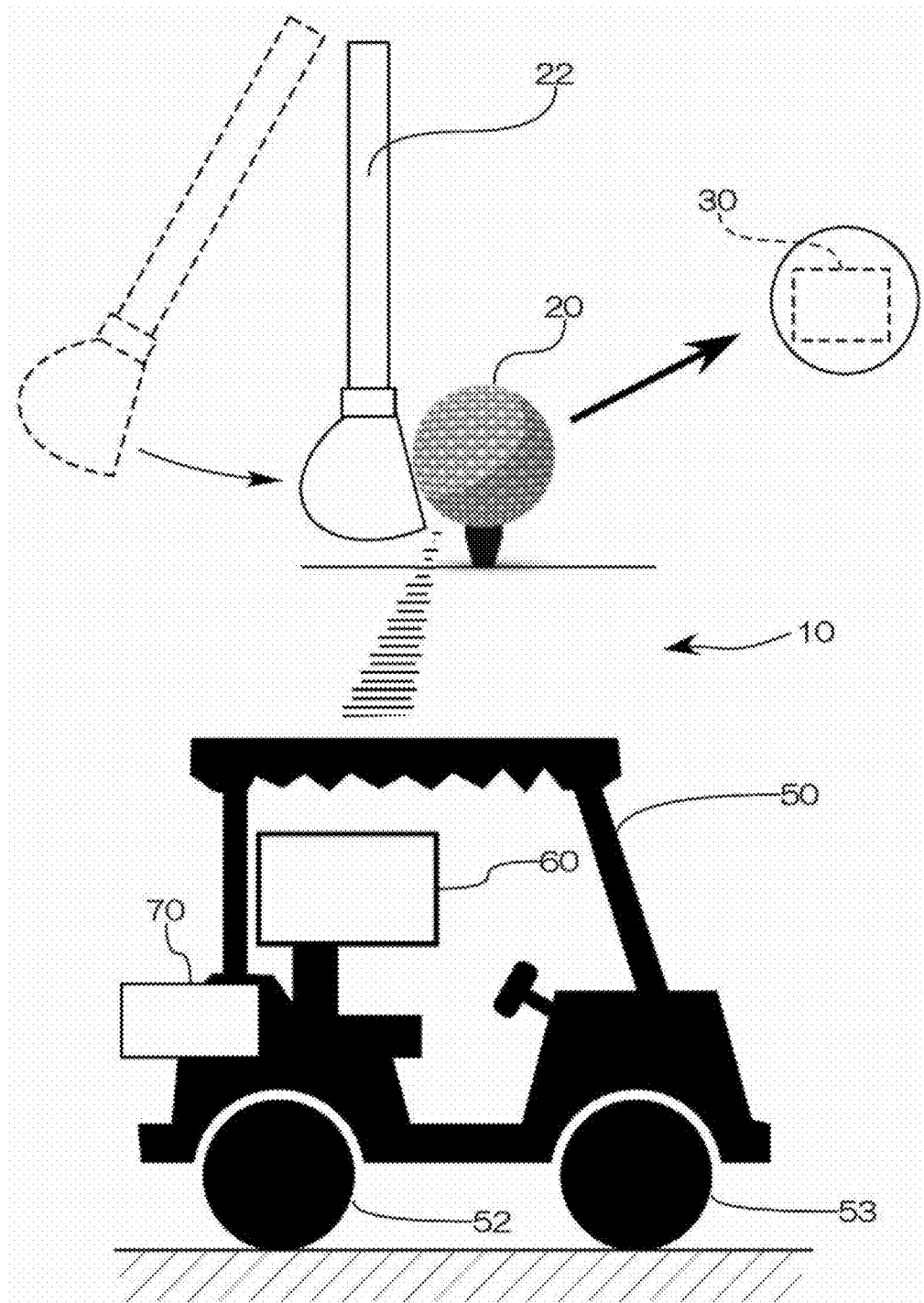
FIG. 1 is an explanatory view of a mobile body position display system according to an exemplary embodiment.

1 Overall Configuration:

FIG. 1 is an explanatory diagram illustrating an overall configuration of a mobile body position display system 10 that detects a position of a golf ball 20 being a mobile body. As illustrated, the golf ball 20 is a normal golf ball, except that a control unit 30 is included inside. The golf ball 20 is struck out by a hitting impact from a golf club 22, flies by a distance in accordance with strength of the hitting impact while generally drawing a parabola, and falls down.

Specifically, in a horizontal direction, the golf ball 20 performs uniform move, and decelerates by receiving resistance of air. In a vertical direction, the golf ball 20 gains altitude to a vertex while receiving acceleration of gravity and gradually decelerating. After passing the vertex, the golf ball 20 receives acceleration of gravity, and falls down. After falling down, the golf ball 20 runs by a certain distance, depending on a condition of a ground surface, and then stops. As a matter of course, the hitting impact of the golf club 22 spins the golf ball 20, and a flight direction thereof is not constant when the golf ball 20 flies as a slice or hook ball, for example. Further, a golf course includes not only a flat surface, but various types of hazards such as a rough ground, a bush, and a bunker. Therefore, where the golf ball 20 flies or stops cannot be specified. In some cases, a player may lose track of the golf ball 20.

As described later, the golf ball 20 includes a communication unit inside, and is capable of transmitting and receiving information through communication to/from a cart control unit 70 installed in a golf cart 50. The cart control unit 70 communicates with the golf ball 20, and displays a position of the golf ball 20 on a liquid crystal display (hereinafter, simply referred to as a display) 60 at a predetermined timing. The golf cart 50 includes a battery and a motor as power sources, and travels when the motor drives driven wheels 52, and a steering wheel or the like steers steered wheels 53. However, those configurations are publicly known, and hence detailed description is omitted.

Figure 2:
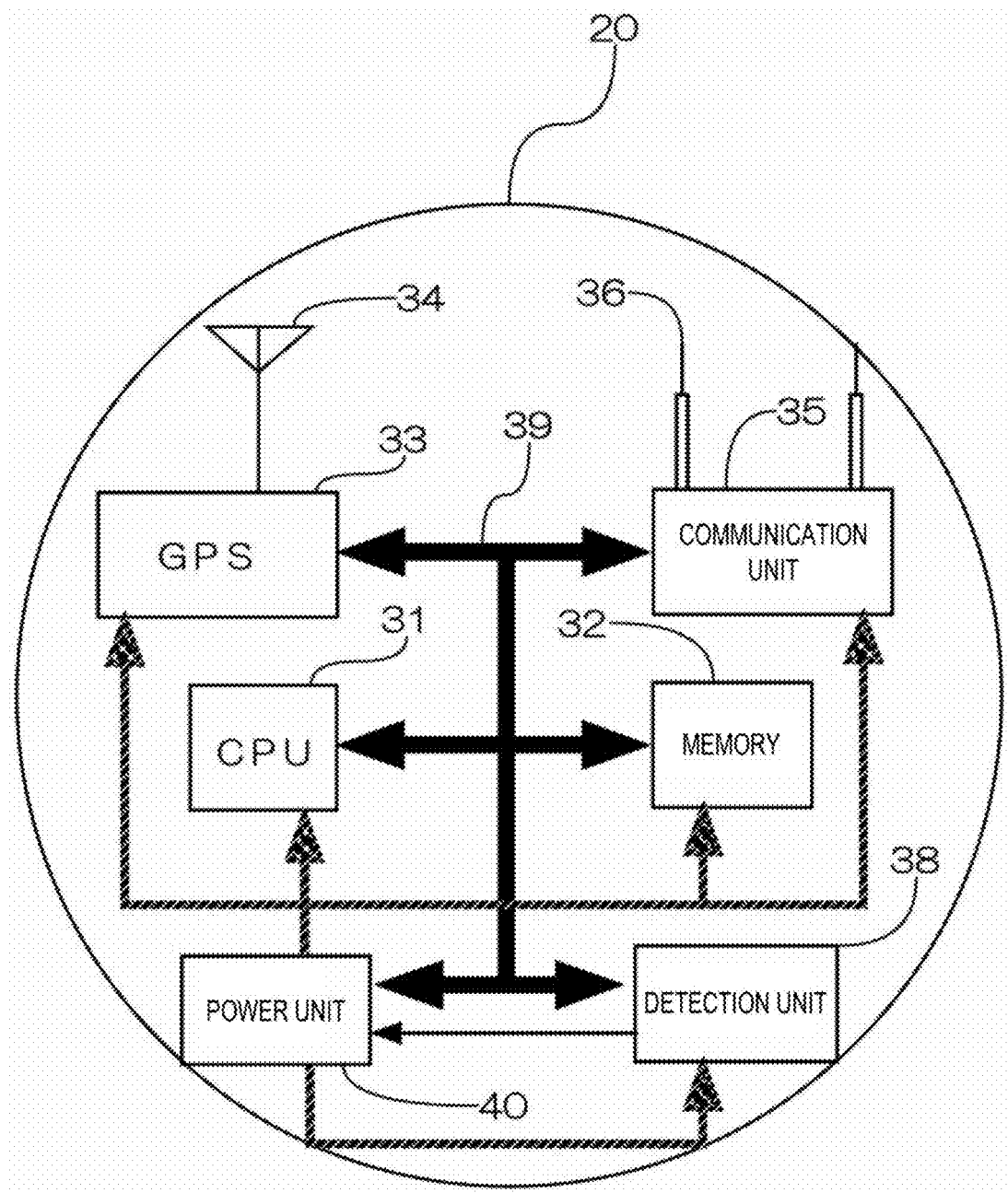
FIG. 2 is a block diagram illustrating an internal configuration of a golf ball.

FIG. 2 is a block diagram illustrating a configuration of the control unit 30 in the golf ball 20. The golf ball 20 has a structure in which the control unit 30 is obtained by molding a resin forming a normal core. The control unit 30 includes a CPU 31 that performs control, a memory 32 that stores programs and various types of data, a GPS circuit 33 serving as a position specification unit that detects an own position using the GNSS, a communication unit 35 serving as an output unit that outputs a beacon and performs communication with the outside along with the output, a detection unit 38 that detects acceleration applied to the golf ball 20, and a power unit 40 that supplies power to each unit. In the present exemplary embodiment, the detection unit 38 includes a sensor that detects acceleration in three axial directions perpendicular to one another. The detection unit 38 may use an Inertial Measurement Unit (IMU) that detects translational motion and rotational motion in the perpendicular three axial directions. The IMU detects translational motion with an acceleration sensor and rotational motion with a gyro sensor that detects an angular velocity. As a matter of course, as the detection unit 38, a single gyro sensor that detects acceleration or an angular velocity may be used. Antennas 34 and 36 are provided to the GPS circuit 33 and the communication unit 35, respectively, and those antennas 34 and 36 are arranged at positions close to the surface of the golf ball 20. Each unit from the CPU 31 to the power unit 40 is coupled to one another via an inner bus 39 in such a way as to mutually transmit and receive data.

As illustrated, the power unit 40 is capable of supplying power independently to each unit from the CPU 31 to the detection unit 38. Specifically, instead of supplying power uniformly to all the circuit parts, the power unit 40 is capable of achieving power supply modes including a stand-by mode of supplying power only to the detection unit 38, a position detection mode of supplying power to the CPU 31, the memory 32, and the GPS circuit 33, a communication mode of stopping power supply to the GPS circuit 33 and supplying power to the CPU 31, the memory 32, and the communication unit 35, and the like. Power used by the power unit 40 is supplied from a lithium-ion battery included inside the power unit 40, which is not illustrated. The power unit 40 may not only use a primary battery, but also utilizes a secondary battery and a power generator as a power source. Other configurations of the power unit 40 are collectively described later.

Figure 3:
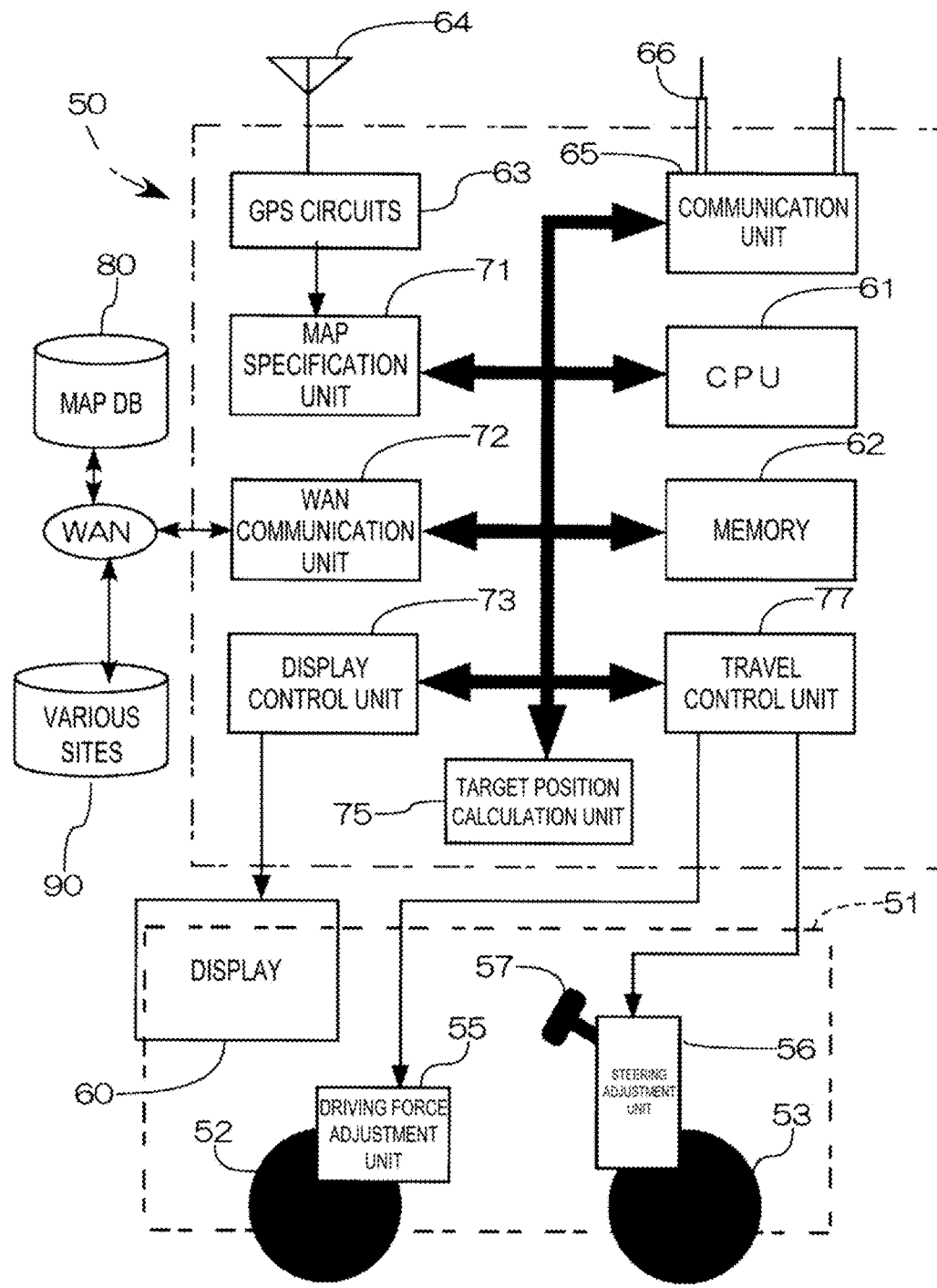
FIG. 3 is a schematic configuration view of a golf cart.

A configuration of the golf cart 50 that communicates with the golf ball 20 is described with reference to FIG. 3. As illustrated, in addition to the cart control unit 70, the golf cart 50 includes an operation control unit 51 that controls traveling of the golf cart 50. The cart control unit 70 includes a CPU 61 that performs control, a memory 62 that stores programs and various types of data, a GPS 63 that detects its own position using the GNSS, a communication unit 65 that communicates with the golf ball 20, a map specification unit 71 that specifies a map to be displayed, based on the own position, a WAN communication unit 72 that acquires information via an external wide area network (WAN), a display control unit 73 that controls display on the display 60 installed in the golf cart 50, a target position calculation unit 75 that calculates a target position of the golf cart 50, a travel control unit 77 that causes the golf cart 50 to travel in accordance with the obtained target position, and the like. The GPS 63 and the communication unit 65 include antennas 64 and 66 respectively that perform communication. Further, the WAN communication unit 72 communicates with an external map database (abbreviated as DB in the drawing) 80 and various sites 90 via the WAN, and acquires desired data. A map specified by the map specification unit 71 is acquired from the map database 80. Position information of a GPS satellite that can be used by the GPS 63 and the like are acquired from the various sites 90.

The target position calculation unit 75 calculates a next target position to which the golf cart 50 is to travel. Normally, a plurality of people play golf, and hence a plurality of players ride on the golf cart 50. In this case, the golf ball 20 is associated with each player. Thus, after the plurality of players shoot their own golf balls 20, the golf cart 50 travels to proximity positions subsequently from the golf ball 20 at the nearest position. Thus, based on the position of the golf ball 20, the target position to which the golf cart 50 travels is calculated.

When the target position is calculated, the travel control unit 77 outputs an instruction to the operation control unit 51 in such a way as to cause the golf cart 50 to travel to the target position. Contents of the instruction mainly include a driving force instruction signal for a driving force adjustment unit 55 and a steering instruction signal for a steering adjustment unit 56. The driving force adjustment unit 55 that receives the driving force instruction signal adjusts a driving force of a motor, which is not illustrated, and drives the driven wheels 52. At the time of stop, regenerative brake of the motor is utilized. Further, the steering adjustment unit 56 that receives the steering instruction signal drives a steering motor, which is not illustrated, adjusts a steering angle of the steered wheels 53, and causes the golf cart 50 to advance straight or turn at an appropriate angle. Specifically, the golf cart 50 is automatically operated. In this case, the golf cart 50 stores, on a map, a runway in which the golf cart 50 can travel, and travels along the runway. Note that a passenger on the golf cart 50 can secure safety of a traveling place of the golf cart 50, by operating a steering wheel 57, a brake pedal, which is not illustrated, or the like.

Figure 5:
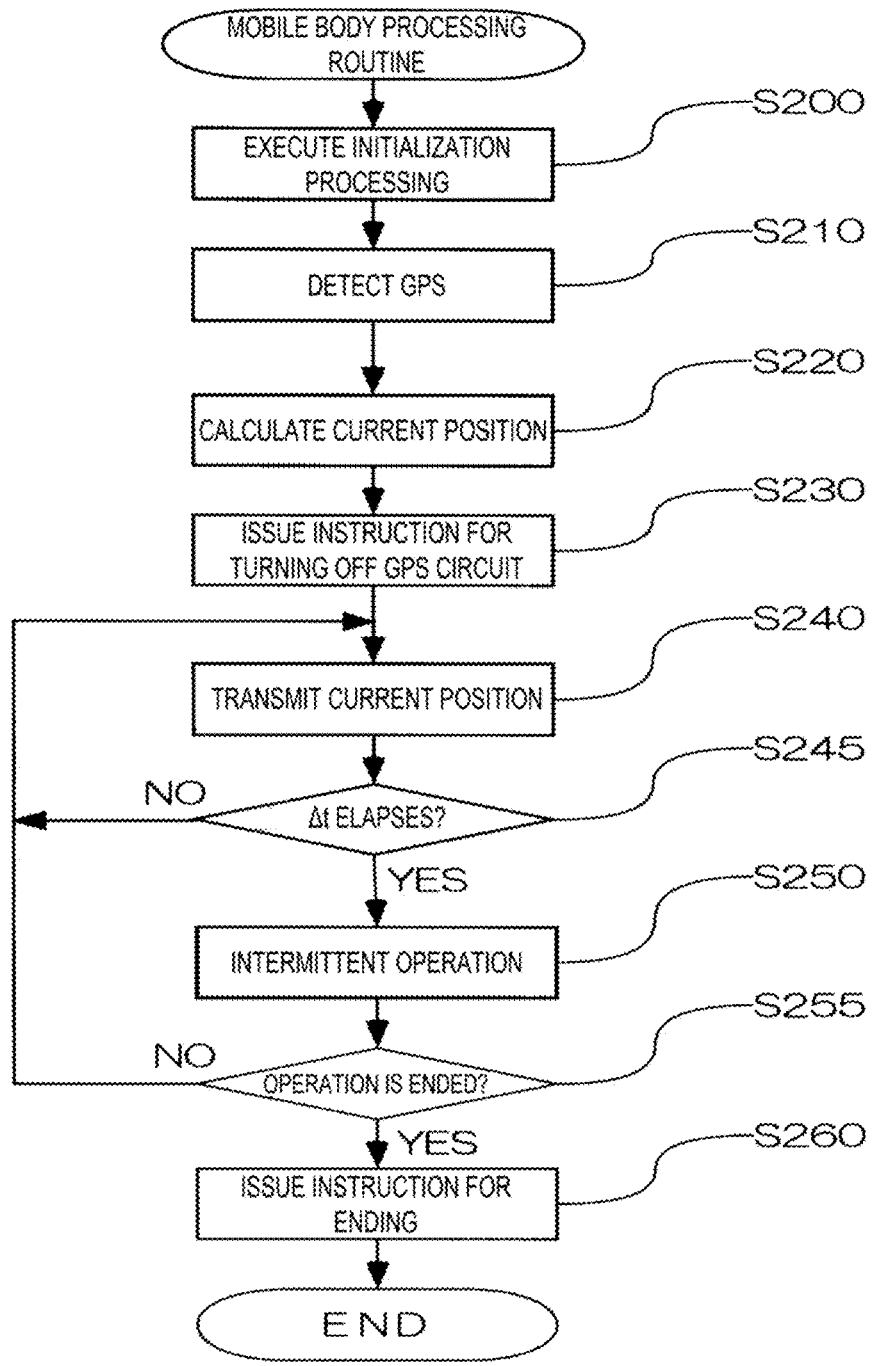
FIG. 5 is a flowchart illustrating a mobile body processing routine executed by a control unit in the golf ball.
Figure 6:
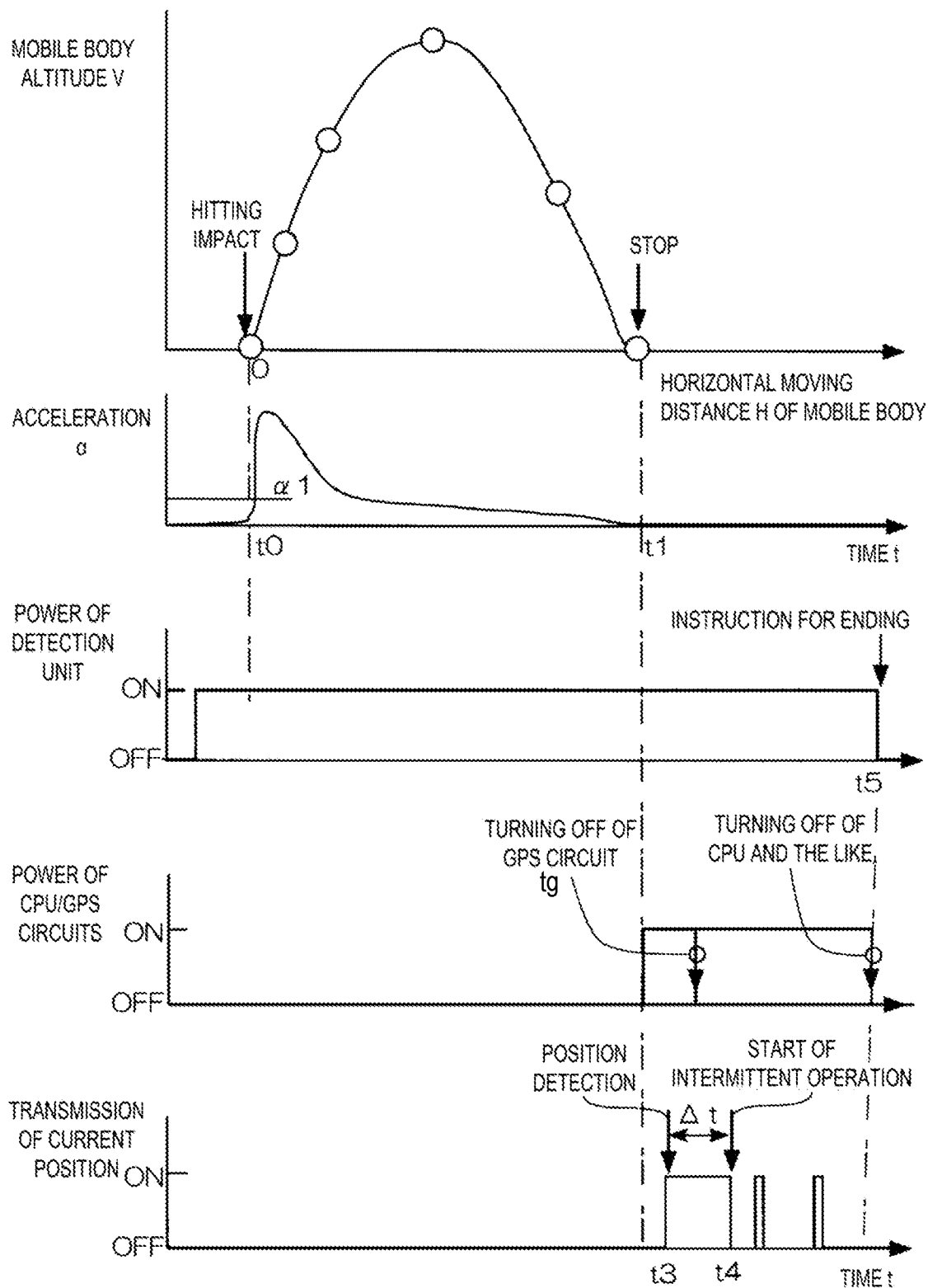
FIG. 6 is a timing chart illustrating flight of the golf ball and an operation of each unit in this case.

2 Processing at Each Device:

Next, processing executed by the control units of the golf ball 20 and the golf cart 50 is described. First, processing of the power unit 40 in the golf ball 20 is described with reference to the flowchart in FIG. 4, and processing executed by the CPU 31 in the golf ball 20 is described with reference to the flowchart in FIG. 5. Further, with reference to the timing chart in FIG. 6, conditions of the golf ball 20 and operations of the units are described in association with each other. In FIG. 6, the horizontal axis in the uppermost stage indicates a horizontal movement distance from a position at which the golf ball 20 is struck out, and all the horizontal axes in the other stages indicate time. A place in which the golf ball 20 is placed and is struck out by the golf club 22 is indicated with a position 0, and a striking time is indicated with a time t0. The horizontal axis in the uppermost stage indicates a horizontal movement distance. Thus, in the uppermost stage, data is present on a right side with respect to a position at which the golf ball 20 stops. Meanwhile, in the stages other than the uppermost stage, the horizontal axes indicate "time". Thus, an operation of each unit changes over time even on a right side with respect to a time t1 at which the golf ball 20, which is struck out and flies, falls down, runs, and stops. The details thereof are sequentially described following the flowcharts of processing.

Figure 4:
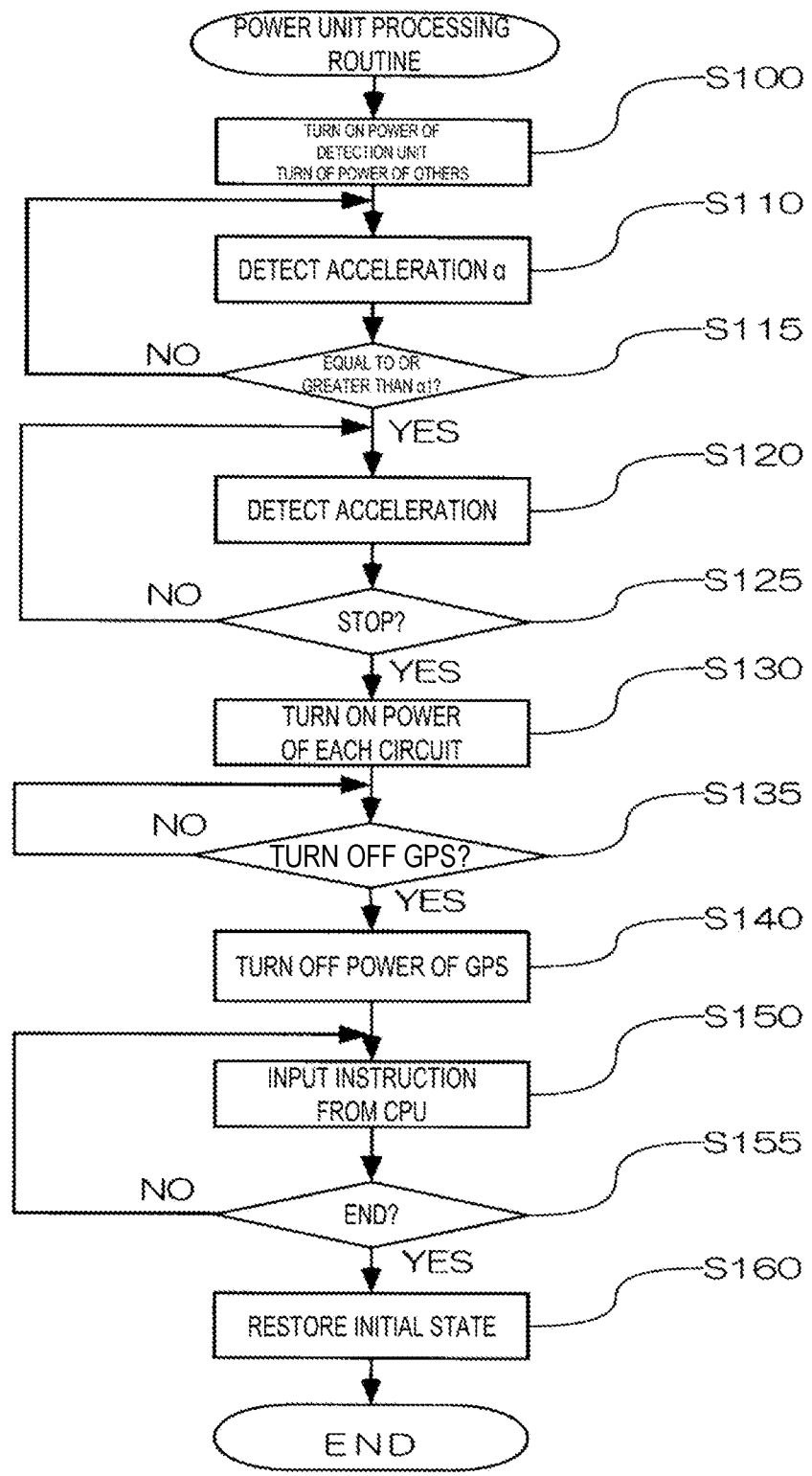
FIG. 4 is a flowchart illustrating a power unit processing routine in the golf ball.

The power unit 40 includes a one-chip microcomputer inside, and executes the following power unit processing routine. The power unit 40 may always be in a conduction state, or may be activated when power is applied as described later. The power unit 40 includes an all-solid battery of several tens of milliwatts inside. When the processing routine illustrated in FIG. 4 is activated, the microcomputer included inside the power unit 40 first turns on the power of the detection unit 38, and turns off the power of the other units, that is, the CPU 31, the GPS circuit 33, and the like (Step S100). Subsequently, the detection unit 38 executes processing of detecting acceleration a applied to the golf ball 20 (Step S110). The detection unit 38 is capable of detecting acceleration in each of the three axial directions perpendicular to one another. Herein, an absolute value |α| of acceleration applied to the golf ball 20 is obtained based on the acceleration in each of the three axial directions. Subsequently, it is determined whether the obtained acceleration a is equal to or greater than a threshold value α1 set in advance for determination (Step S115).

When the acceleration α is less than the threshold value α1, the routine returns to Step S110, and repeats the processing from the detection of acceleration. When it is determined that the detected acceleration α is equal to or greater than the threshold value α1, the routine proceeds to Step S120, and detection of acceleration of the golf ball 20 is further continued using the detection unit 38. The golf ball 20, which is struck out by a hitting impact using the golf club 22 receives acceleration of gravity in the vertical direction. Thus, the golf ball rises while decelerating, and eventually falls down. In this moment, the golf ball 20 performs free motion, and hence an influence of acceleration of gravity is zero inside the golf ball 20. However, the golf ball 20 decelerates due to resistance of air, and thus receives negative acceleration. Further, the golf ball 20 rotates, and hence receives a centrifugal force. This force is also detected as acceleration. Specifically, the golf ball 20 receives some sort of acceleration during free motion including free fall, until the golf ball 20 stops, and the detection unit 38 is capable of detecting this acceleration. The acceleration is obtained as an absolute value of acceleration obtained by synthesizing acceleration in each axial direction of the three-axis angular velocity sensor included inside the detection unit 38.

When the golf ball 20 falls down onto the ground surface, an impact onto the ground surface can be detected as large acceleration. Such detection of acceleration (Step S120) is continued, and it is determined whether the golf ball 20 stops, based on the detected acceleration (Step S125). Until the golf ball 20 stops, detection of acceleration is continued. When stop of the golf ball 20 is detected, the power unit 40 turns on power of each circuit, that is, the CPU 31, the memory 32, the GPS circuit 33, the communication unit 35, and the like (Step S130).

This is a timing t1 in FIG. 6. The timing t1 corresponds to a "first timing" being a timing after a mobile body starts movement in the first exemplary embodiment. Note that, in FIG. 6, acceleration generated by an impact of the golf ball 20 onto the ground surface is omitted in illustration.

When power is supplied from the power unit 40, operations of the CPU 31 and the GPS circuit 33 are started. The power unit 40 stands by until a predetermined time elapses (Step S135). The predetermined time is estimated in advance as a time required for completing processing executed by the CPU 31 and the GPS circuit 33. An operation of the CPU 31, which is executed during this predetermined stand-by time, is illustrated in FIG. 5.

When the power unit 40 starts power supply, the CPU 31 of the control unit 30 first executes initialization processing (Step S200). The initialization processing is processing executed directly after the power supply, and is processing of initializing each circuit inside the control unit 30, acquiring an ID number of the golf ball 20, which is stored in the memory 32, and initializing an internal clock. When being subjected to the initialization processing, for example, the GPS circuit 33 is in a state capable of receiving a signal from an artificial satellite via the antenna 34 and acquiring a number of the artificial satellite, time information, and the like contained in the signal. Then, the CPU 31 instructs the GPS circuit 33 to detect a GPS satellite (Step S210). An orbit of each artificial satellite for GPS is known in advance. Thus, when the orbit is stored in the memory 32 in advance, based on the time acquired from the internal clock, general information relating to the artificial satellite present in the sky at the time zone can be obtained. Thus, the GPS circuit 33 can acquire required information from the GPS satellite for a short time.

Subsequently, based on the information that the GPS circuit 33 acquires from the GPS satellite, processing of calculating a current position is executed (Step S220). The GPS circuit 33 may be configured to execute the current position calculation, or the CPU 31 may execute the current position calculation, based on the information that the GPS circuit 33 acquires from the GPS satellite. When the calculation for obtaining a current position of the golf ball 20 is completed in this manner (at a timing t3 in FIG. 6), communication performed by the GPS circuit 33 is no longer required. Thus, the power unit 40 is instructed to stop power supply to the GPS circuit 33 (Step S230). This is because the GPS circuit 33 consumes a large amount of power. This timing is indicated with a time tg illustrated in FIG. 6. In the first exemplary embodiment, this timing corresponds to a "second timing" at which power supply to GPS circuit 33 serving as a position specification unit is stopped.

After the current position calculation is completed, and the processing of stopping the GPS circuit 33 is executed, processing of transmitting information about the obtained current position from the communication unit 35 to the outside is executed (Step S240). In the present exemplary embodiment, this transmission to the outside is performed with a beacon conforming to the standard of Bluetooth Low Energy (trade name) being one kind of low-consumption short-range wireless communication. Hereinafter, this is referred to as BLE transmission. In the BLE transmission, data transmission is performed with a so-called BLE beacon containing necessary information in place of communication with so-called pairing of Bluetooth. Therefore, a person that receives the BLE beacon transmitted from the golf ball 20 using the communication unit 35 is unknown until the person receives and returns some sort of response.

In view of this, the CPU 31 continues transmitting the BLE beacon (Step S230) until a predetermined time Δt elapses (Step S245). The time Δt may be determined by assuming that a player that hits the golf ball 20 with the golf club 22 can recognize a beacon from the golf ball 20. As a matter of course, remaining power of the battery of the power unit 40 and the time Δt may be dependent upon each other, and the time Δt may be increased when the battery has sufficient remaining power.

When the predetermined time Δt elapses (at a timing t4 in FIG. 6), the CPU 31 starts an intermittent operation (Step S250). The intermittent operation indicates an operation state in which the CPU 31 or the like operates at a predetermined interval instead of operating sequentially. When the intermittent operation is started, the CPU 31 operates in such a way as to output a BLE beacon approximately once in several seconds, instead of outputting BLE beacons sequentially. This function of the intermittent operation is embedded in the CPU 31 as a power saving operation. When the intermittent operation is started, the CPU 31 and the communication unit 35 reduce an internal operation clock to a low speed to largely reduce power consumption, and re-start the operation by restoring the internal operation clock to the original speed approximately once in several seconds.

When the operation is re-started from a resting state in the intermittent operation, first, whether the operation of the control unit 30 is to be ended is determined (Step S255). When it is determined that the operation is to be ended, the power unit 40 is instructed to stop power supply (Step S260), and the present processing routine is ended by skipping to "END". A case where the operation of the control unit 30 is ended includes a case where power supply from the power unit 40 is almost enabled due to elapse of a long time in the intermittent operation, or a case where the communication unit 35 receives a signal indicating reception of a BLE beacon transmitted by the golf ball 20 using the communication unit 35. In the latter case, pairing with BLE is performed, the control unit 30 of the golf ball 20 is paired with the cart control unit 70 of the golf cart 50, and transmits and receives the data stored in the memory 32. In this case, as preparation for subsequent use, information relating to the orbit of the GPS satellite and the like may be exchanged together.

When it is determined that the operation of the control unit 30 is not to be ended, (Step S255: "NO"), the routine returns to Step S230, and repeats the processing from the transmission of the current position. Also in this case, the time Δt has already elapsed. Thus, once the current position is transmitted, the intermittent operation is started again, and a power-saving stand-by mode is performed again for several seconds.

During this time, the power unit 40 receives an instruction from the CPU 31, and stops power supply to the GPS circuit 33 at the timing tg (Steps S135 and S140 in FIG. 4). Further, after that, an ending instruction from the CPU 31 is awaited (Step S150). When the ending instruction from the CPU 31 is received (Step S155: "YES"), processing of restoring the inside of the control unit 30 to an initial state is executed (Step S160). The initial state indicates a state before starting Step S100, and indicates a state in which power supply to the units other than at least the power unit 40 and the detection unit 38 is turned off. This timing is indicated with a time t5 in FIG. 6.

Figure 7:
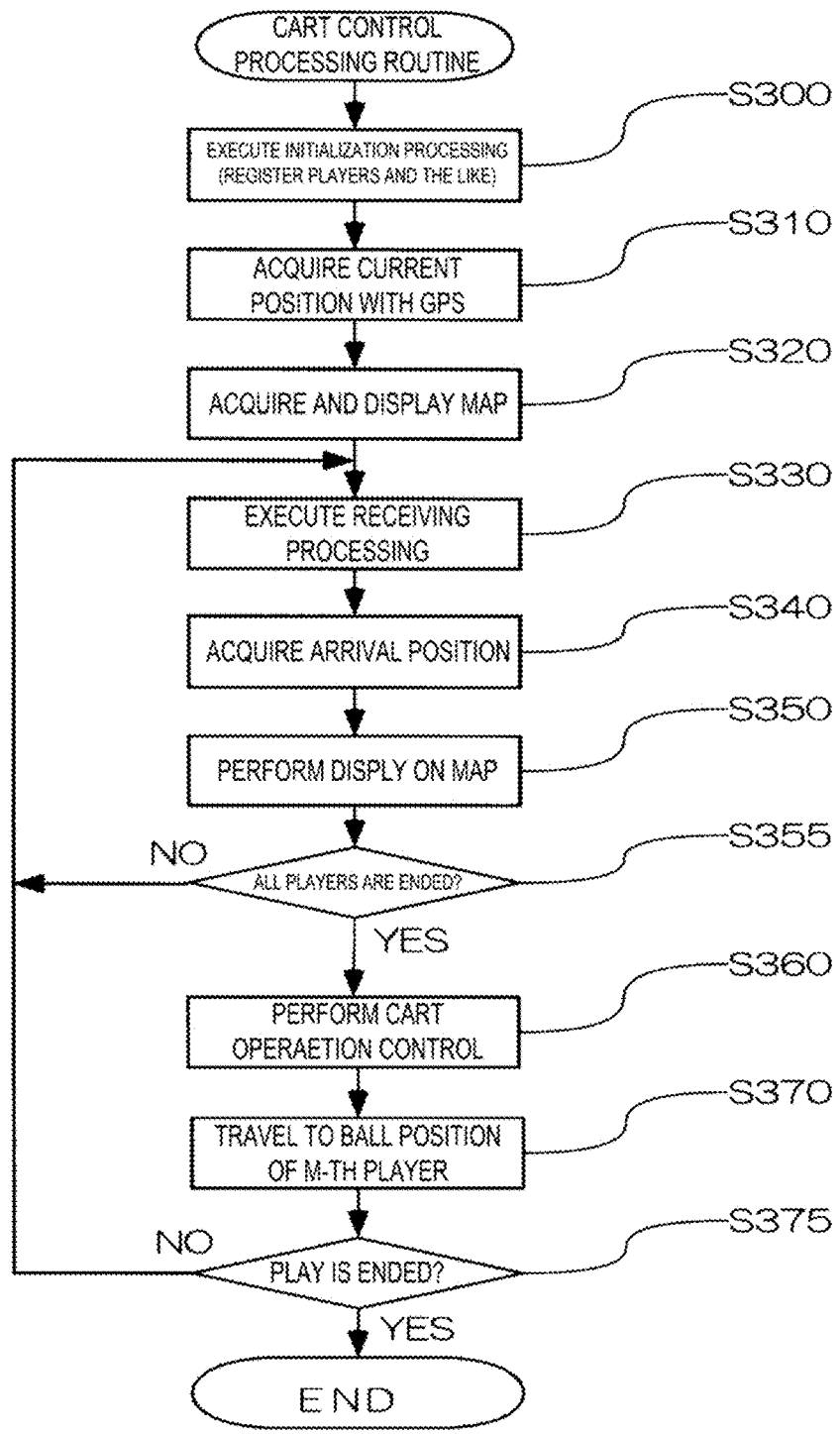
FIG. 7 is a flowchart illustrating a cart control processing routine executed by a control unit of the golf cart.

The processing in the golf ball 20 is described above. After the processing in the golf ball 20, the golf cart 50 constituting the mobile body position display system 10 operates as in the following. A cart control processing routine executed by the cart control unit 70 of the golf cart 50 is described with reference to the flowchart in FIG. 7.

The processing is started when power is supplied to the golf cart 50 and the cart control unit 70, and initialization processing is executed first (Step S300). Examples of the initialization processing include processing of initializing each element and circuit in the cart control unit 70, registering golf players, and the like. In the present exemplary embodiment, each player registers a name and an avatar of a player, and further registers an ID of the golf ball 20 to be used. The registered information is stored in the memory 62.

Subsequently, the CPU 61 of the cart control unit 70 operates the GPS 63 and the map specification unit 71, and acquires a current position (Step S310). Further, the CPU 61 uses the communication unit 72 to acquire a map indicating the current position from the map database 80 via the WAN, and displays the map on the display 60 (Step S320).

Subsequently, the communication unit 65 starts processing of receiving the BLE beacon from the golf ball 20 (Step S330). The ID of the golf ball 20 used by each player is registered, and hence this processing may be started immediately. Alternatively, Step S330 and the following steps may be started after all the players shoot the golf balls 20 by using an operation unit, which is not illustrated.

When the CPU 61 uses the communication unit 65 to receive the BLE beacon from the golf ball 20, the CPU 61 determines which player's golf ball 20 arrives at which position, based on the ID and the current position of the golf ball 20 contained in the BLE beacon (Step S340), and the arrival position is displayed on the map displayed on the display 60 (Step S350). The display of the golf ball 20 may be performed by blinking a bright spot overlapping the map displayed on the display 60 or displaying a name or an avatar of a player that uses the golf ball. As a matter of course, a flight distance from a tee or a linear track may be displayed together.

After that, whether the processing is ended for all the players is determined (Step S355), and when the processing is not ended, the routine returns to Step S330, and the routine is executed until the above-described processing is ended for all the players (Steps S330 to S355). For all the players, acquisition of the arrival positions of the golf ball 20 being used and display thereof on the map on the display 60 are completed. Subsequently, the golf cart 50 is under operation control (Step S360). The operation control for the golf cart 50 is performed by operating an operation unit, which is not illustrated, and starting an operation of the golf cart 50.

Specifically, in the operation control for the cart (Step S360), the travel control unit 77 transmits a control signal to the driving force adjustment unit 55 and the steering adjustment unit 56 of the operation control unit 51. With this, the golf cart 50 is caused to travel along a card road and to stop near the nearest position of the golf ball 20 of an M-th player (Step S370). The player gets off the golf cart 50, walks toward the position displayed on the display 60, finds his or her own golf ball 20, and continues a play. In this case, the golf ball 20 is restored to the initial state. Thus, the power unit 40 and the control unit 30 of the golf ball 20 operate similarly to a case where the golf ball 20 is shot at a tee.

The cart sequentially travels to the positions of the golf balls 20 in this manner, and plays are continued. Until the plays on a hole are ended, the above-described processing from Steps S330 to S370 is repeated. When all the plays are ended (Step S375), the present processing routine is ended by skipping to "END".

The operations of the respective units of the first exemplary embodiment, which are described above, are summarized and illustrated in FIG. 7. On the golf ball 20 side, the power unit 40, the CPU 31, the GPS circuit 33, and the like are exemplified as representative constituent elements. The communication unit 35 operates similarly to the CPU 31.

Further, on the golf cart 50 side, display performed by the cart control unit 70 is exemplified. Further, the operation condition is classified into "before use", "the time of starting movement (to)", "during movement (t0 to t1)", the time of falling down and stopping (t1)", "the predetermined period after the stop (until t4)", and "the final state".

As illustrated, in the first exemplary embodiment, power of the power unit 40 of the golf ball 20 is always turned on. At the time of starting usage, power of the CPU 31 and the GPS circuit 33 is in an off state. After the golf ball 20 moves, falls down, and stops, power of the CPU 31 and the GPS circuit 33 is turned on. Then, the CPU 31 starts the processing (FIG. 5). When power is turned on, the own position, or the arrival position for the player is obtained by the GPS circuit 33. Then, power of the GPS circuit 33 is turned off. When the predetermined time Δt elapses, the CPU 31 starts the intermittent operation together with the communication unit 35, and finally, power thereof is turned off.

Meanwhile, the cart control unit 70 of the golf cart 50 first registers each of the golf balls 20, and then acquires the map of the present position of the golf cart 50. After that, the control unit 30 of the golf ball 20 executes the above-mentioned processing. With this, the position is acquired with the BLE beacon from the golf ball 20, and the position is displayed on the map on the display 60.

According to the first exemplary embodiment described above, the golf ball 20 being a mobile body includes the power unit 40, the GPS circuit 33, and the like, and is capable of detecting a position of the mobile body by itself and transmitting the position to the outside. Moreover, as indicated with the bold frame PT1 in FIG. 8, the operation time of the GPS circuit 33 is suppressed to a slight time from falling and stopping of the golf ball 20 to acquisition of the own position (the times t1 to tg). Thus, while providing the configuration capable of transmitting the position of the golf ball 20 being a mobile body to the outside, power consumption can be sufficiently reduced. With this, power of the battery included inside the power unit 40 is not consumed wastefully. As a result, even when replacement or re-charging of the battery cannot be performed, long-term usage can be enabled. Moreover, in the present exemplary embodiment, in order to further reduce power consumption, continuous transmission of the BLE beacons is limited during the predetermined time Δt. After that, the BLE beacon is output in the intermittent operation. Thus, power consumed by the CPU 31 and the communication unit 35 can be reduced. Further, when the golf cart 50 approaches, and pairing is performed with the cart control unit 70 during output of the BLE beacon, the control unit 30 of the golf ball 20 is initialized, and is restored to the initial state. Thus, power consumed by the golf ball 20 can further be reduced.

Further, in the mobile body position display system 10 of the present exemplary embodiment, the BLE beacon from the golf ball 20 is utilized. Thus, even when the plurality of golf balls 20 are used, radio interference or the like is not caused.

B. Second Exemplary Embodiment

Next, a second exemplary embodiment is described. The mobile body position display system 10 of the second exemplary embodiment uses the same hardware configuration as that of the first exemplary embodiment. However, control for turning on/off power of each unit in the control unit 30 of the golf ball 20. FIG. 9 is an explanatory view illustrating an operation of each unit in the second exemplary embodiment. As illustrated, the second exemplary embodiment is similar to the first exemplary embodiment with regard to the state before use, but is different from the first exemplary embodiment in that the CPU 31 and the GPS circuit 33 are turned on at the timing to at which a hitting impact is detected. In the second exemplary embodiment, this timing to corresponds to the "first timing". Similarly in the first exemplary embodiment, the "second timing" corresponds to the timing tg. In the second exemplary embodiment, when the golf ball 20 is hit by the golf club 22, the detection unit 38 detects the acceleration. Then, the CPU 31 and the GPS circuit 33 are turned on. Thus, before falling down onto the ground surface or stopping, the CPU 31 and the GPS circuit 33 can start detection of a GPS satellite, calculation of the own position, and the like. As soon as falling down onto the ground surface and stopping, the CPU 31 and the GPS circuit 33 can measure the stop position, and can transmit the stop position as a BLE beacon to the outside. Thus, as indicated with the bold frame PT2 in FIG. 9, measurement of the stop position of the golf ball 20 can be completed in a short period. Moreover, an operation time of the GPS circuit 33 with largest power consumption can be limited to a short period. Other actions and effects are similar to those in the first exemplary embodiment.

C. Third Exemplary Embodiment

A third exemplary embodiment is described. The mobile body position display system 10 of the third exemplary embodiment uses substantially the same hardware configuration as that of the first exemplary embodiment. However, control for turning on/off power of each unit in the control unit 30 of the golf ball 20. FIG. 10 is an explanatory view illustrating an operation of each unit in the third exemplary embodiment. In the third exemplary embodiment, as illustrated, in the state before use, power of each unit other than the GPS circuit 33 is turned on. With this, the control unit 30 of the golf ball 20 performs communication by using the communication unit 35, and communicates with the communication unit 65 of the cart control unit 70 of the golf cart 50. In this manner, pairing between both the units is performed. Thus, in the third exemplary embodiment, the detection unit 38 that detects a hitting impact on the golf ball 20 is not necessarily required, and hence may be removed, or may be included and used auxiliarly. In the present exemplary embodiment, this is because the GPS circuit 33 detects falling and stopping of the golf ball 20, and because acceleration is not required for detecting falling and stopping of the golf ball 20.

In the present exemplary embodiment, the control unit 30 performs pairing with the cart control unit 70 via the communication unit 35. Thus, when a player hits the golf ball 20 with the golf club 22, and is away from a range in which the golf ball 20 can perform pairing, the CPU 31 of the control unit 30 can detect that the player is outside the range. The third exemplary embodiment is different from the first and second exemplary embodiments in that the GPS circuit 33 is turned on at the timing to at which the pairing is canceled. In the third exemplary embodiment, the timing at which the paring is canceled corresponds to the "first timing". Thus, the detection unit 38 that detects a strong hitting impact of the golf club 22 is not necessarily required. Generally, the paring is canceled before the golf ball 20 falls down onto the ground surface and stops. Thus, also in the third exemplary embodiment, before falling down onto the ground surface or stopping, the CPU 31 and the GPS circuit 33 can start detection of a GPS satellite, calculation of the own position, and the like. As soon as falling down onto the ground surface and stopping, the CPU 31 and the GPS circuit 33 can measure the stop position, and can transmit the stop position as a BLE beacon to the outside. Thus, as indicated with the bold frame PT3 in FIG. 10, measurement of the stop position of the golf ball 20 can be completed in a short period. Moreover, an operation time of the GPS circuit 33 with largest power consumption can be limited to a short period. Other actions and effects are similar to those in the first and second exemplary embodiments.

D. Other Exemplary Embodiments

In each of the exemplary embodiments described above, the GPS circuit 33 measures a position, and the BLE beacon indicating the current position is transmitted after the golf ball 20 falls down and stops. Alternatively, the GPS circuit 33 may measure a position, and the BLE beacon indicating the current position may be transmitted immediately after a hitting impact is applied on the golf ball 20. In this manner, the cart control unit 70 can acquire a track of the golf ball 20 from its launch, which is limited within the arrival range of the BLE beacon, and can display the track on the display 60. Also in this case, when measurement of the position is completed after the golf ball 20 falls down and stops, power of the GPS circuit 33 with large power consumption can be turned off, and power consumption can be reduced as a whole. Further, the second timing at which power of the GPS circuit 33 is turned off may be the same timing as the timing at which power supply to the CPU 31 and the like is turned off.

Figure 11:
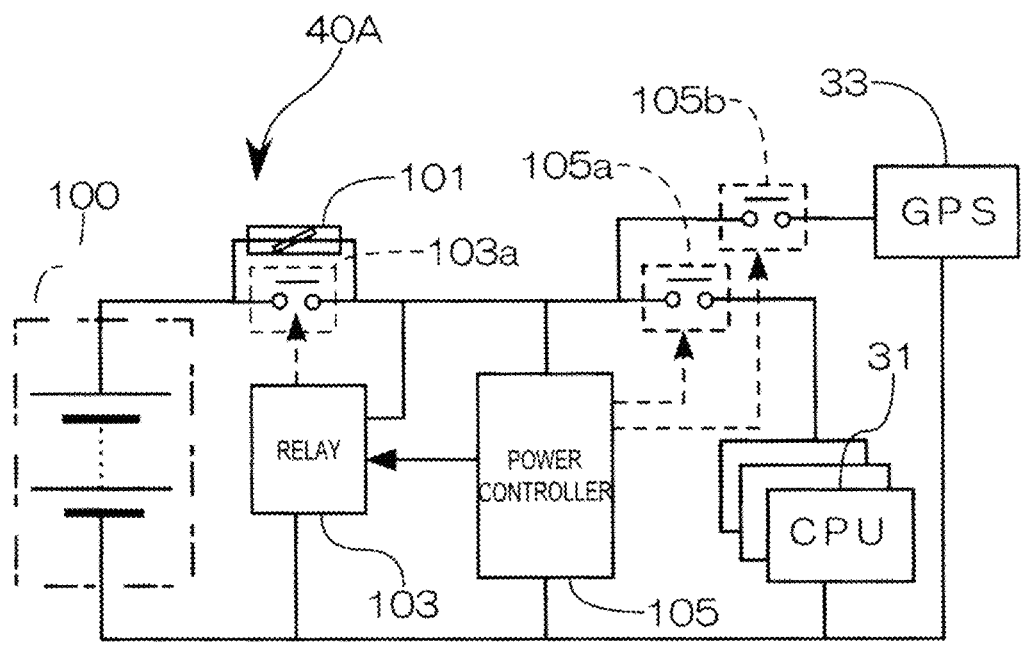
FIG. 11 is a circuit diagram illustrating a configuration example of a power unit.

In each of the exemplary embodiments described above, power for driving the control unit 30 of the golf ball 20 is supplied from the lithium-ion battery included inside the power unit 40. In a case of this primary battery, it is desired that power consumption of the battery be reduced as much as possible. For example, as illustrated in FIG. 11, a power unit 40A having a configuration capable of turning off a battery 100 being a primary battery can be used. The power unit 40A includes a lead switch 101 that turns on/off power supply from the battery 100, a relay 103 having a contact point 103a coupled to the lead switch 101 in parallel, and a power controller 105 that controls power supply to the CPU 31 and the like, and the GPS circuit 33. The power controller 105 is capable of controlling the relay 103, a contact point 105a, and the contact point 105b.

When a magnet approaches the golf ball 20 including the power unit 40A, the lead switch 101 detects the magnet, and is in a conduction state. As a result, power is supplied from the battery 100 to the relay 103 and the power controller 105, and the relay 103 closes the contact point 103a. The contact point 103a is coupled to the lead switch 101 in parallel. Thus, even when the magnet is taken away, and conduction of the lead switch 101 is canceled, power of the battery 100 still keeps being supplied via the contact point 103a. Specifically, the relay 103 functions as a self-maintaining circuit. Then, the power controller 105 turns on (closes) or turns off (opens) the contact point 105a and the contact point 105b as appropriate, and turns on/off power supply to the CPU 31 and the like, and the GPS circuit 33.

The power unit 40A is not coupled to an external circuit at all until the magnet approaches to cause the lead switch 101 to be in a conduction state in such a way as to use the golf ball 20, and its power consumption is limited to self-discharging. When a lithium coin battery with less self-discharging is used, power exhaustion of the battery 100 in an unused state is rare, and the battery withstands long-term storage. Once the magnet approaches the lead switch 101 to establish a conduction state, self-maintenance is performed by the relay 103, and power supply to circuits such as the CPU 31 and the like, and the GPS circuit 33 can be controlled under the control of the power controller 105.

Then, when the power controller 105 stops conduction to the relay 103 at the timing (t5) at which communication is established with the cart control unit 70 of the golf cart 50, the contact point 103a is opened to restore a state in which power supply from the battery 100 is completely blocked.

In this manner as described above, exhaustion of the battery 100 being a primary battery can be delayed, and the golf ball 20 can be used repeatedly. As a matter of course, an opening/closing portion may be provided in the golf ball 20, and the battery 100 may be replaceable.

A large impact from the golf club 22 is applied to the golf ball 20. Thus, when the opening/closing portion is provided, a structure withstanding a hitting impact is employed. For example, the golf ball 20 is divided into two semi-spheres. An external screw is formed on a cross-sectional outer circumference of one semi-sphere, and an internal screw is formed in a cross-sectional outer circumference of the other semi-sphere. Then, both the screws are engaged to each other. Such structure may be employed. When the mobile body is an arrow, a miniature rocket (for example, a model rocket (trade name)), or a ball for a throwing device, instead of the golf ball 20, a structure of replacing a primary battery is further simple.

Figure 12:
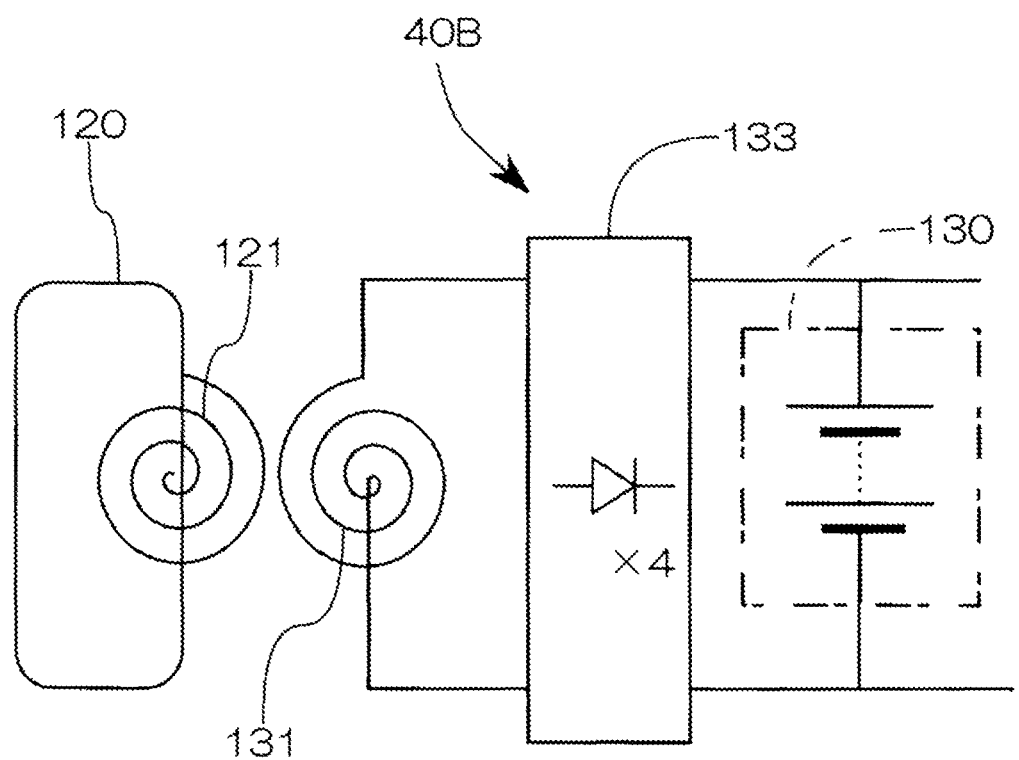
FIG. 12 is a circuit diagram illustrating another configuration example of the power unit.

The power unit of the golf ball 20 may have a configuration in which a chargeable secondary battery is used as a battery and the battery is wirelessly charged from the outside. FIG. 12 is a circuit diagram illustrating main parts of a power unit 40B having such configuration. The power unit 40B includes a secondary battery 130, a power-receiving coil 131 for wireless power supply, and a diode bridge 133 that rectifies an AC received by the power-receiving coil 131. When the golf ball 20 including the power unit 40B is put on a power-transmitting coil 121 of a wireless power supply device 120, AC power is transmitted via coupling between the power-transmitting coil 121 and the power-receiving coil 131. This power is converted into a DC by the diode bridge 133, and the secondary battery 130 is charged. With power charged to the secondary battery 130, the control unit 30 of the golf ball 20, which is described in the first to third exemplary embodiments, is operated. In this manner, the golf ball 20 can be used repeatedly. Note that an actual circuit requires a circuit that adjusts a charging voltage and prevents excessing charging and the like. However, the circuit is publicly known, and hence is omitted in illustration.

Figure 13:
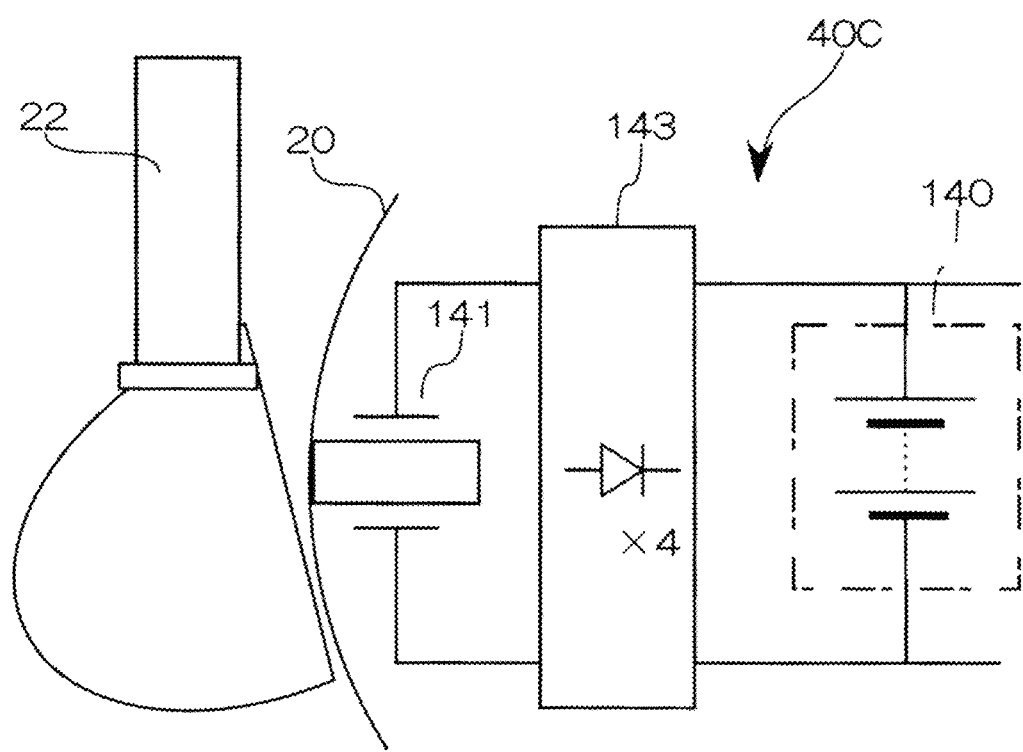
FIG. 13 is a circuit diagram illustrating further another configuration example of the power unit.

The power unit of the golf ball 20 may have a configuration in which a power generator is embedded and power generated by the power generator is accumulated in a battery, a capacitor, or the like, and is used. FIG. 13 is a circuit diagram illustrating main parts of a power unit 40C having such configuration. The power unit 40C includes a power storage device (capacitor) 140, an oscillation power generating element 141 that generates power from a hitting impact, and a diode bridge 143 that rectifies an AC generated by the oscillation power generating element 141. When the golf ball 20 including the power unit 40C is hit by the golf club 22, a force of the hitting impact distorts the oscillation power generating element 141. With a piezoelectric effect, spike-shaped power is generated. This power is converted into a DV by the diode bridge 143, and the capacitor 140 is charged. As a matter of course, power that can be generated by one hitting impact is small. Thus, in place of a hitting impact of the golf club 22, for example, charging is repeated by causing the golf ball 20 to repeatedly bounce on a hard floor surface such as a concrete floor. With this, the capacitor 140 may accumulate power.

With power charged to the capacitor 140, the control unit 30 of the golf ball 20, which is described in the first to third exemplary embodiments, is operated. In this manner, the golf ball 20 can be used repeatedly. Note that an actual circuit requires a circuit that lowers a voltage output from the oscillation power generating element 141 and prevents excessing charging and the like. However the circuit is publicly known, and hence is omitted in illustration.

In the exemplary embodiment described above, a launch of the golf ball 20 is detected by acceleration detected by the detection unit 38 or a pairing condition established by the communication unit 35. Alternatively, the golf ball 20 may include an altimeter inside, and a launch of the golf ball 20 may be detected when an altitude changes by a predetermined degree or more.

In the exemplary embodiments described above, as the position specification unit, the GNSS is used.

Alternatively, instead of using such artificial satellite for positioning, a configuration in which positioning is performed by receiving a radio wave from a transmitter on the ground is also employed easily. For example, a differential GPS provided with a transmitter on the ground for supporting the GPS, or a transmitter of a beacon is arranged, and positioning is performed by detecting the beacon. Such configuration may be used.

Further, in the exemplary embodiment described above, the display 60 is included in and wired to the golf cart 50. Alternatively, the cart control unit 70 and the display 60 may be coupled to each other wirelessly. Further, the display 60 may be achieved as a mobile terminal such as a smartphone carried by a user, instead of being included in the golf cart 50. A dedicated application program is installed in the mobile terminal, and the cart control unit 70 receives an image signal to display the image on a display of the mobile terminal, which is achieved easily.

Figure 14:
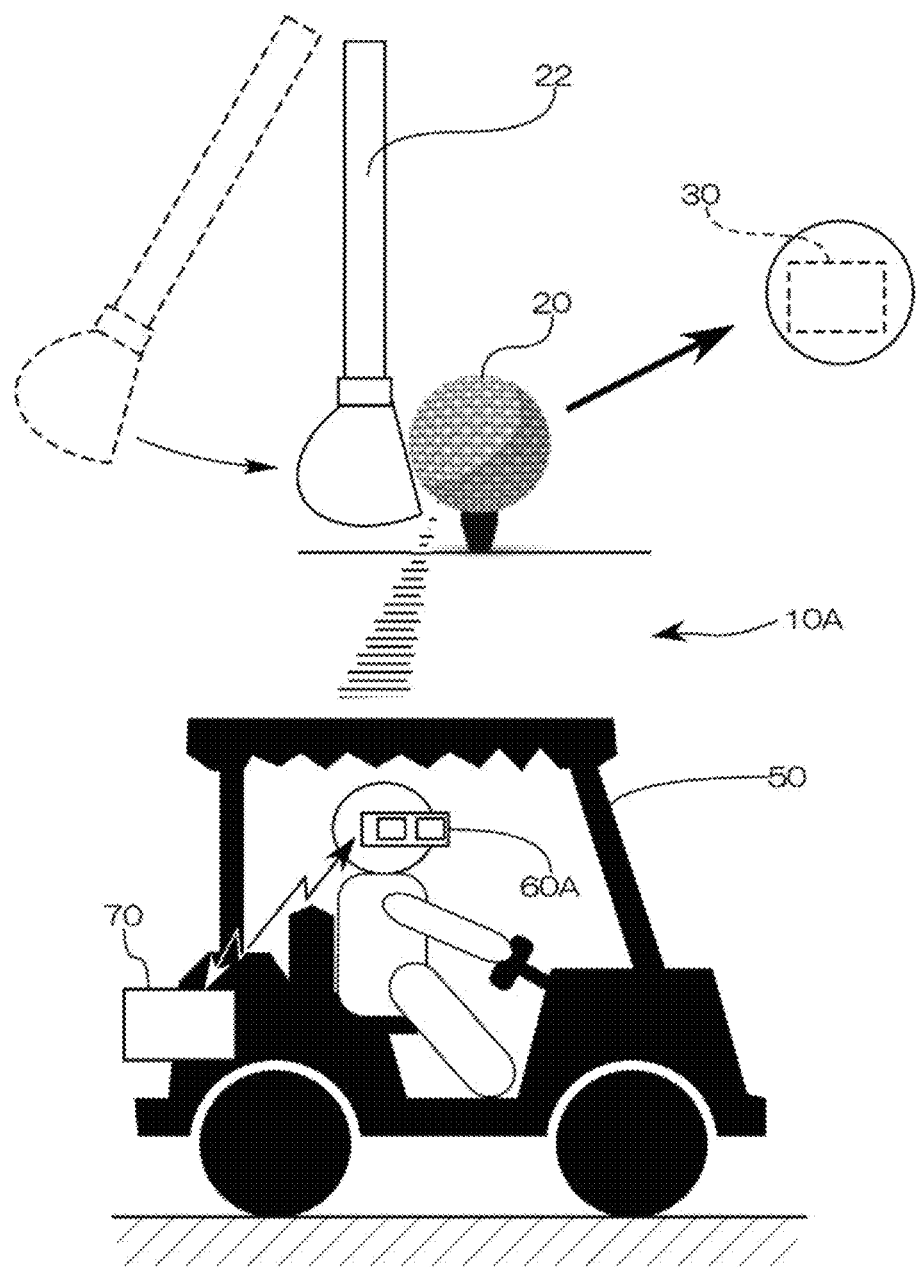
FIG. 14 is an explanatory view illustrating another mode of a display.

Alternatively, as illustrated in FIG. 14, a display of a mobile body position display system 10A may be a head-mounted display (hereinafter, simply referred to an HMD) 60A to be mounted on a head of a player. In this case, the HMD 60A and the reference symbol 70 are wirelessly coupled to each other. With this, a player can freely leave the golf cart 50, which is desirable. Further, in this case, all the configurations of the cart control unit 70 except for the travel control unit 77 may be included in the HMD 60A. The HMD 60A may be a type that enables an external scene to be visually recognized, and may be a type that displays a position and a track of the golf ball 20 by overlapping such objects on an external scene. Further, a direction in which the golf ball 20 is present may be indicated with an arrow or the like, and navigation may be performed for a user wearing the HMD 60A.

E. Other Modes (1) In addition to the matters described above, a mobile body according to the present disclosure may employ a mode of including a position specification unit configured to specify a current position of the mobile body, a detection unit configured to detect that the mobile body is in a still state after starting moving from a still state, an output unit configured to output, to an outside, a signal containing the specified current position, and a power unit configured to supply power to power-consuming units inside the mobile body, and supply power to the position specification unit during a period from first timing after the mobile body starts the movement to second timing after the mobile body enters the still state. Here, the first timing may be a timing at which the mobile body starts movement due to a hitting impact or other external forces, or may be a timing at which the mobile body exceeds a predetermined range from a movement start position. Alternatively, the first timing may be a timing at which the mobile body is in a still state after starting moving. Further, the second timing may be a timing at which the mobile body is in a still state after starting moving and specification of the current position is completed, or may be a timing at which a predetermined period elapses from the completion. Further, the second timing may be a timing at which the output unit outputs the current position and then an external device responds to the output. Power supplied to the position specification unit may be power for operating the position specification unit.

Alternatively, there may be employed a configuration in which power is supplied to a terminal enabling an operation of the position specification unit without changing a voltage applied to an electronic circuit and a chip that constitute the position specification unit, and in which the position specification unit is operated from the first timing to the second timing.

(2) In the mobile body described above, the position specification unit may be a global navigation satellite system. In addition to the GPS operated by the United States of America, examples of the global navigation satellite system (GNSS) include Galileo operated by the EU, the GLONASS operated by Russian Federation, BeiDou Navigation Satellite System (BDS) operated by China, and the like. The position specification unit may use one of those, or may use a plurality types of the systems in combination. When the GNSS is used, positioning can be performed no matter where on the earth or no matter when.

(3) In the mobile body described above, the position specification unit may detect a signal from a beacon arranged on a ground, uses position information that is associated with a beacon ID in advance, the beacon ID being contained in the signal from the beacon, and may specify the current position. As example of such method, a differential GPS provided with a transmitter on the ground for supporting the GPS, a system in which a transmitter of a BLE beacon is arranged, and the like are known. When a signal from the beacon arranged on the ground is used, positioning can be achieved with a simple configuration. The beacon may contain information of a position (latitude, longitude, altitude, or the like) itself. Alternatively, instead of containing the position information, a map in which the position information is associated with an ID of the bacon may be prepared. Such map may be prepared locally, for example, for each golf course. Note that, when a transmitter of a beacon is prepared in a three-dimensional manner, an altitude of the mobile body is detected easily.

(4) In the mobile body described above, the position specification unit may further detect intensity of the signal from each of a plurality of beacons, use the position information associated with the ID of each of the plurality of beacons and the intensity of the signal from each of the plurality of beacons, and specify the current position. In this manner, a distance to the beacon can be estimated, and hence positioning accuracy can be improved. As a matter of course, instead of detecting the intensity of the beacon, a mode of simply using only the ID of the beacon may be employed.

(5) In the mobile body described above, the detection unit may be any one of an acceleration sensor, a global navigation satellite system, a pairing device for an information terminal, and an altimeter. In this manner, it can be easily detected that the mobile body in a still state after starting moving from a still state. In addition to the configurations described above, for example, it is assumed that a plurality of retractable protrusions, each of which is urged by a spring or the like toward a projection position, are provided on the outer circumference of the mobile body. When any one of the plurality of protrusions retracts in the mobile body due to a hitting impact, restores to the original position during free fall, and then any one of the plurality of protrusions retracts in the mobile body when falling down onto the ground, it may be determined that the mobile body in a still state after starting moving from a still state.

(6) In the mobile body described above, the power unit may stop supplying the power to the each unit after the current position is specified, and intermittently supplies power to the output unit with a predetermined pause period, and the output unit may output the signal containing the current position during the intermittent power supply. In this manner, power consumption in the mobile body can further be reduced. The predetermined pause period may be performed at a constant interval, or may be performed at random. Further, the pause period may not be provided.

(7) In the mobile body described above, the output unit may output the signal by communication using a short-range wireless communication technology with a reach distance of at least 10 meters. In this manner, even when a person who uses the mobile body loses track of the mobile body, the person may easily achieve an action of grasping the position of the mobile body and collecting the mobile body. As example of such short-range wireless communication technology, various methods such as Bluetooth (trade name) and WiFi (trade name) are known.

(8) In the mobile body described above, the power unit may include at least one of a primary battery, a secondary battery, and a power generator. When a primary battery is used, a circuit configuration can be simplified. When a secondary battery is used, repetitive use can be achieved. When a power generator is used, charging from the outside is not required. Note that, when a primary battery is used, the mobile body may be disposable. Alternatively, an opening/closing portion may be provided in the mobile body, a primary battery such as a coin battery or a button battery may be replaceable.

(9) In the mobile body described above, the power unit may include a power-receiving device configured to receive power from an external wireless power supply device, and a power storage device configured to temporarily store power received by the power-receiving device. In this manner, power supply from the outside can be performed easily, and the mobile body can be used repeatedly.

(10) In the mobile body described above, the power unit may include an oscillation power generating element configured to perform oscillation power generation, and a power storage device configured to temporarily store power generated by the oscillation power generating element. In this manner, power can be generated from oscillation applied to the mobile body, and the mobile body can be used repeatedly. Note that a power generator is not limited to oscillation power generation. For example, a solar battery, a temperature-difference power generator, and the like may be employed.

(11) Further, a mobile body position display system according to the present disclosure the mobile body according to any one of those described above, and a display control device configured to receive the signal from the mobile body and display the current position of the mobile body. In this manner, the position of the mobile body can be grasped easily. The display control device may be an installation type using a liquid crystal display panel, an organic EL panel, or the like, or may be a projection type using a projector or the like. Further, a head-mounted display type to be mounted on a head of a user may be used. As a matter of course, the display control device may be achieved with a mobile terminal.

(12) In the mobile body position display system described above, the mobile body may be any one of a golf ball, an arrow shot from a crossbow, a model rocket (trade name), and a ball for a throwing device. When a position of any of those mobile bodies can be displayed, the mobile body can be collected easily. This is because any of those mobile bodies is highly possible to fly by a moving distance of a range in which visual confirmation is not always easy. As long as such characteristics are seen, any mobile body may be employed.

(13) In the mobile body position display system described above, the display control device may be provided to a vehicle. In this manner, it is easy to approach the mobile body while confirming a position of the mobile body from the vehicle. Note that, in a case where the mobile body is collected on the sea, a ship, a hovercraft, or the like may be used in place of the vehicle. As a matter of course, the display control device may be an installation type.

(14) In the mobile body position display system described above, the display control device may include a head-mounted type display device to be mounted on a head of a user, the first timing at which the power unit supplies power to the position specification unit may correspond to a predetermined timing after the mobile body starts movement and before the mobile body stops, and the display control device may receive the signal from the mobile body, and display at least part of a trajectory of the movement of the mobile body on the head-mounted type display device. In this manner, a user can visually recognize the trajectory of the movement of the mobile body easily. The head-mounted type display device may be a type that enables an external scene to be visually recognized, and may be a type that displays a track by overlapping an actual space in which the mobile body moves.

(15) A method of displaying a mobile body according to the present disclosure includes operating a position specification unit configured to specify a current position of the mobile body, thereby specifying a position of the mobile body, detecting that the mobile body is in a still state after starting moving from a still state, outputting, to an outside, a signal containing the specified current position, supplying power to power-consuming units inside the mobile body, and supplying power to the position specification unit during a period from first timing after the mobile body starts the movement to second timing after the mobile body enters the still state, and receiving the signal from the mobile body, and displaying the current position of the mobile body on a display unit. In this manner, the position of the mobile body can be grasped easily.

(16) In each of the exemplary embodiments described above, part of the configuration achieved by the hardware may be replaced with software. At least part of the configuration achieved by the software may also be replaced with a discrete circuit configuration. Further, in a case where part of the functions or the entire functions of the present disclosure is achieved by the software, the software (computer program) may be provided in a form stored in a computer-readable recording medium. The "computer-readable recording medium" is not limited to a portable recording medium such as a flexible disk and a CD-ROM, but includes various internal storage devices such as a RAM and a ROM and various external storage devices fixed to a computer such as a hard disk. In other words, the "computer-readable recording medium" has a broad range of definition including any freely-selected recording device capable of non-transitorily and fixedly storing data packets.

The present disclosure is not limited to the exemplary embodiments described above, and can be realized in various configurations without departing from the gist of the present disclosure. For example, appropriate replacements or combinations may be made to the technical features in the exemplary embodiments which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A mobile body, comprising:
    a processor;
    a sensor configured to detect that the mobile body is in a still state after starting moving from a still state;
    a GPS circuit configured to specify a current position of the mobile body at a first timing, the first timing being when the sensor detects that the mobile body is in the still state;
    a wireless communication device configured to output, to an outside of the mobile body, a signal containing the specified current position; and
    a power supply configured to supply power to the processor inside the mobile body, and supply power to the GPS circuit during a period from the first timing to a second timing, wherein the second timing is when the GPS circuit specifying the current position of the mobile body is completed.

2. The mobile body according to claim 1, wherein the GPS circuit comprises a global navigation satellite system.

3. The mobile body according to claim 1, wherein the GPS circuit further includes a receiver configured to detect a signal from a beacon arranged on a ground and configured in a differential GPS, and specify the current position using position information that is associated, in advance, with a beacon ID contained in the signal from the beacon, wherein the beacon arranged on the ground is a reference station in the differential GPS.

4. The mobile body according to claim 3, wherein the GPS circuit further detects intensity of the signal from a plurality of beacons, and specifies the current position using the position information associated with IDs of the plurality of beacons and the intensity of the signal from the plurality of beacons.

5. The mobile body according to claim 1, wherein the sensor is any one of an acceleration sensor, a pairing device for an information terminal, and an altimeter.

6. The mobile body according to claim 1, wherein the power supply is configured to stop supplying the power to the GPS circuit at the second timing at which the mobile body is in the still state and specification of the current position is completed, and the power supply is further configured to intermittently supply power to the wireless communication device with a predetermined pause period, and
the wireless communication device outputs the signal containing the current position during the intermittent power supply.

7. The mobile body according to claim 1, wherein the wireless communication device outputs the signal by communication using a short-range wireless communication technology with a reach distance of at least 10 meters.

8. The mobile body according to claim 1, wherein the power supply includes at least one of a primary battery, a secondary battery, and a power generator.

9. The mobile body according to claim 1, wherein the power supply includes a power-receiving coil configured to receive power from an external wireless power supply, and a capacitor configured to temporarily store power received by the power-receiving coil.

10. The mobile body according to claim 1, wherein the power supply includes an oscillation power generator configured to perform oscillation power generation, and a capacitor configured to temporarily store power generated by the oscillation power generator.

11. A mobile body position display system, comprising:
    the mobile body according to claim 1; and
    a display configured to receive the signal from the mobile body and display the current position of the mobile body.

12. The mobile body position display system according to claim 11, wherein the mobile body comprises any one of a golf ball, an arrow, a miniature rocket, and a ball for a throwing device.

13. The mobile body position display system according to claim 11, wherein the display is provided to a vehicle.

14. The mobile body position display system according to claim 11, wherein
    the display includes a head-mounted display device to be mounted on a head of a user,
    the first timing at which the power supply supplies power to the GPS circuit is a predetermined timing after the mobile body starts moving and before the mobile body stops, and
    the display receives the signal from the mobile body, and displays at least part of a trajectory of the movement of the mobile body on the head-mounted type display device.

15. A mobile body position display method of displaying a position of a mobile body, the method comprising:
    detecting that the mobile body is in a still state after starting moving from a still state;
    operating a GPS circuit configured to specify a current position of the mobile body at first timing, the first timing being when the sensor detects that the mobile body is in the still state;
    outputting, to an outside of the mobile body, a signal containing the specified current position;
    supplying power to a processor inside the mobile body, and supplying power to the GPS circuit during a period from the first timing to second timing, wherein the second timing is when the GPS circuit specifying the current position of the mobile body is completed; and
    receiving the signal from the mobile body, and displaying the current position of the mobile body on a display unit.

* * * * *